(12) United States Patent
Sun et al.

(10) Patent No.: US 8,737,060 B2
(45) Date of Patent: May 27, 2014

(54) COMPUTER SYSTEM WITH AIRFLOW GUIDING DUCT

(75) Inventors: Hong-Zhi Sun, Wuhan (CN); Tian Wang, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 109 days.

(21) Appl. No.: 13/427,911

(22) Filed: Mar. 23, 2012

(65) Prior Publication Data
US 2012/0327586 A1  Dec. 27, 2012

(30) Foreign Application Priority Data
Jun. 24, 2011 (CN) .......................... 2011 1 0173108

(51) Int. Cl.
*G06F 1/20* (2006.01)
*H05K 5/00* (2006.01)

(52) U.S. Cl.
USPC .................... 361/679.49; 361/695; 361/679.5; 361/679.51; 454/184

(58) Field of Classification Search
USPC ........... 361/679.46–55, 679.5, 679.6, 679.01, 361/679.02, 688–727, 104.33, 361/104.21–104.26; 165/80.1–80.3, 185, 165/104.26, 104.33, 104.21–104.24; 174/721–722, 15.1, 16.1–16.3, 174/547–548; 257/721–722; 454/184
See application file for complete search history.

(56) References Cited

U.S. PATENT DOCUMENTS

| | | | |
|---|---|---|---|
| 7,742,296 B2 * | 6/2010 | Lai et al. .................... | 361/679.5 |
| 8,072,753 B2 * | 12/2011 | Sun ............................... | 361/695 |
| 8,081,444 B2 * | 12/2011 | Xiao et al. ............... | 361/679.49 |
| 8,335,082 B2 * | 12/2012 | Sun et al. ..................... | 361/695 |
| 2009/0168330 A1 * | 7/2009 | Li et al. .................... | 361/679.47 |
| 2011/0141688 A1 * | 6/2011 | Li et al. .................... | 361/679.51 |
| 2012/0044634 A1 * | 2/2012 | Huang et al. ............. | 361/679.49 |
| 2012/0120595 A1 * | 5/2012 | Sun et al. .................. | 361/679.47 |
| 2012/0327589 A1 * | 12/2012 | Sun et al. .................. | 361/679.47 |

* cited by examiner

*Primary Examiner* — Zachary M Pape
*Assistant Examiner* — Razmeen Gafur
(74) *Attorney, Agent, or Firm* — Novak Druce Connolly Bove + Quigg LLP

(57) ABSTRACT

A computer system includes a computer case, a receiving tray, and a bracket. The computer case includes a front plate with a plurality of air intakes and a first side plate. The receiving tray includes a retaining wall. The bracket includes a first mounting plate and a second mounting plate. A plurality of first through hole is defined in the first mounting plate, and a plurality of second through hole is defined in the second mounting plate. The airflow guiding duct includes a first guiding plate and a second guiding plate. The first guiding plate is located between the front plate and the first mounting plate, the second guiding plate is located between the bracket and the first side plate; the plurality of air intakes, the airflow guiding duct, the plurality of first through hole second through hole together form a path for the air to flow.

18 Claims, 4 Drawing Sheets

COMPUTER SYSTEM WITH AIRFLOW GUIDING DUCT

BACKGROUND

1. Technical Field

The present disclosure relates to computer systems, and more particularly to a computer system with an airflow guiding duct.

2. Description of Related Art

Heat dissipating devices perform a critical function of removing heat from an electronic device. The heat dissipating device often includes one or more fans received in a bracket. Airflow from outside of the electronic device is directed inside and then back out of the electronic device by the fan, for dissipating heat generated in the electronic device. However, if the air flows in a disorderly manner in the electronic device, a heat dissipating efficiency of the electronic device may be decreased. Therefore, computer systems with improved heat dissipating efficiencies may be desired within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
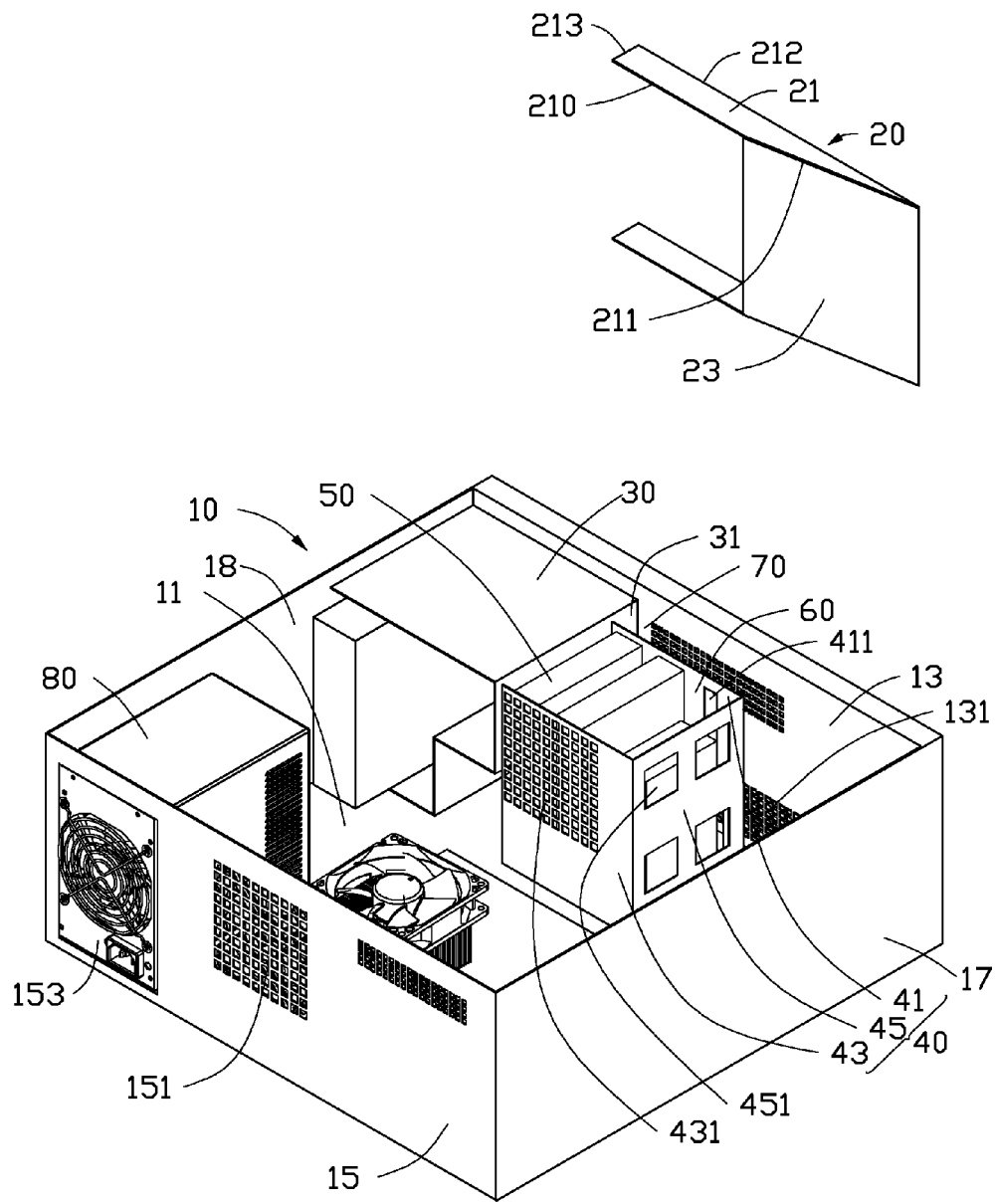
FIG. 1 is an isometric, exploded view of an embodiment of a computer system.
Figure 2:
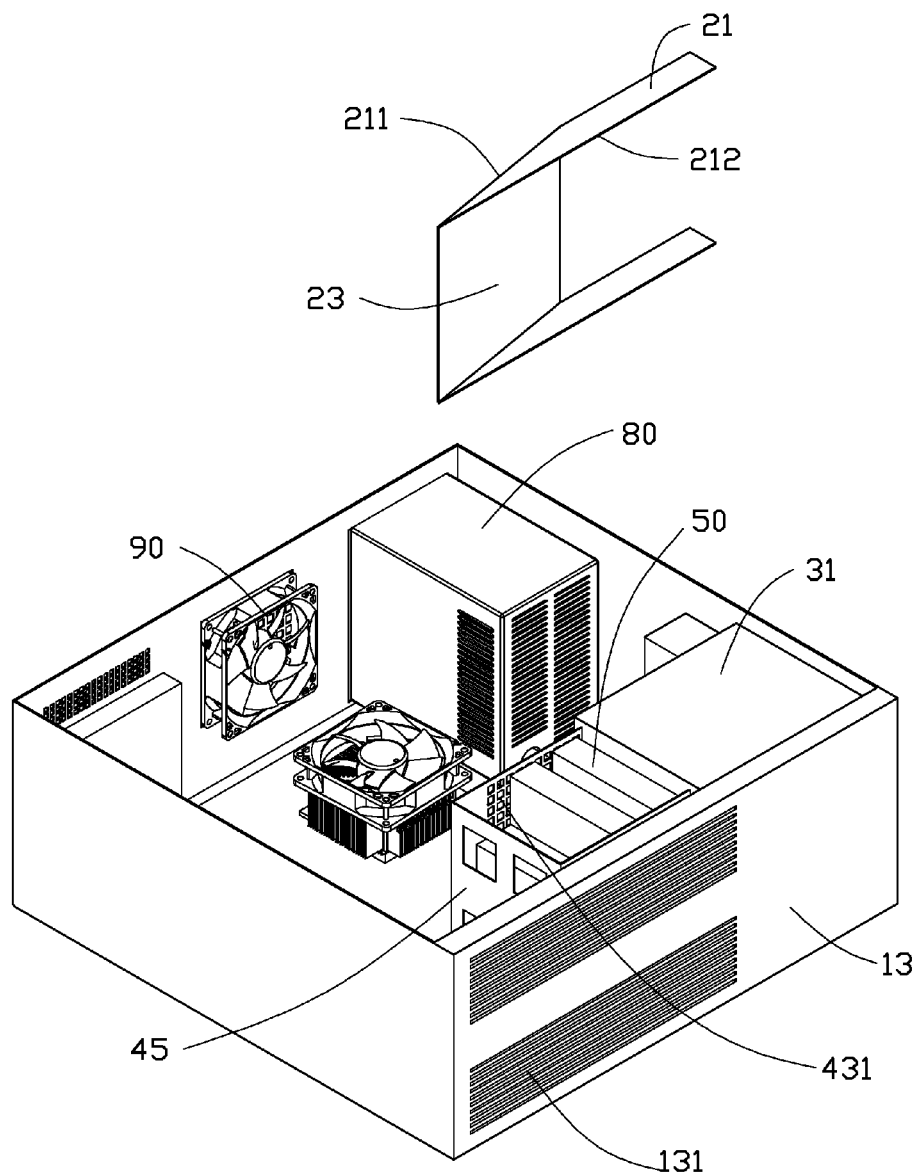
FIG. 2 is similar to FIG. 1, but viewed from a different aspect.

Referring to FIGS. 1 and 2, a computer system in accordance with an embodiment includes a computer case 10 and an airflow guiding duct 20 received in the computer case 10.

The computer case 10 includes a bottom plate 11, a front plate 13, a rear plate 15, a first side plate 17, and a second side plate 18. The front plate 13 and the rear plate 15 are integrated with the bottom plate 11 or otherwise coupled with the bottom plate 11. The computer case 10 can have various configurations, such as a different wall or base configurations so long as the bottom plate 11 is adapted to couple with a cover (not shown) to create a housing. In one embodiment, the front plate 13 is substantially parallel to the rear plate 15 and substantially perpendicular to the bottom plate 11. A plurality of air intakes 131 is defined in the front plate 13, and a plurality of air outlets 151 is defined in the rear plate 15.

A receiving tray 30 is attached to the front plate 13 and the second plate 18. The receiving tray 30 includes a retaining wall 31 away from the second plate 18. In one embodiment, the retaining wall 31 is substantially parallel to the second plate 18 and substantially perpendicular to the front plate 13.

A bracket 40 is attached to the bottom plate 11 and abuts the retaining wall 31. A plurality of first heat generating components 50, such as hard disk drives, is received in the bracket 40. The bracket 40 includes a first mounting plate 41, a second mounting plate 43 opposite to the first mounting plate 41, and a third mounting plate 45. The third mounting plate 45 is connected to the first and the second mounting plates 41, 43. The first, the second and the third mounting plates 41, 43, 45 cooperatively define a receiving space 60 for receiving the plurality of first heat generating components 50. A gap 70 is defined between the first mounting plate 41 and the front plate 13. The first mounting plate 41 defines a plurality of first through holes 411, the second mounting plate 43 defines a plurality of second through holes 431, and the third mounting plate 45 defines a plurality of third through holes 451. In one embodiment, the first mounting plate 41 is substantially parallel to the second mounting plate 43 and the rear plate 15 and substantially perpendicular to the third mounting plate 45.

A power supply 80 is attached to the rear plate 15, and a power supply fan (not shown) is attached to the power supply 80 for cooling the power supply 80. A ventilation hole 153 is defined in the rear plate 15, corresponding to the power supply fan. A fan 90 is attached to the rear plate 15, corresponding to the plurality of air outlets 151.

The airflow guiding duct 20 includes two first guiding plates 21 and a second guiding plate 23 connected to the two first guiding plates 21. In one embodiment, each of the two first guiding plates 21 is right-angled trapezoid. Each of the two first guiding plates 21 includes a first edge 210, a second edge 212, a slanted edge 211 connected to the first edge 210 and the second edge 212, and a right-angled edge 213. The first edge 210 is substantially parallel to the second edge 212, and substantially perpendicular to the right-angled edge 213. The second guiding plate 23 is connected to the slanted edge 211. In one embodiment, a length of the first edge 210 is less than that of the second edge 212. A distance between the first edge 210 and the second edge 212 is substantially equal to that between the first mounting plate 41 and the front plate 13. A length of the first edge 210 is substantially equal to that of the first mounting plate 41, and a length of the second edge 212 is substantially equal to a distance between the retaining wall 31 and the first side plate 17.

Figure 3:
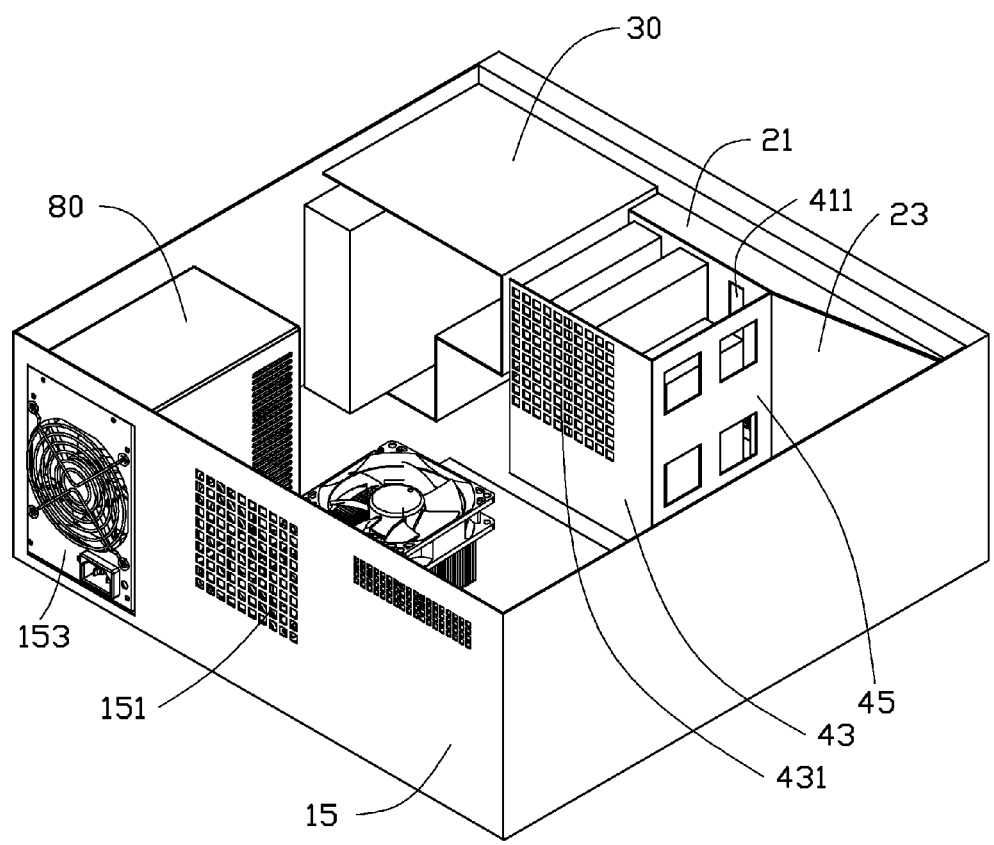
FIG. 3 is an assembled view of FIG. 1.
Figure 4:
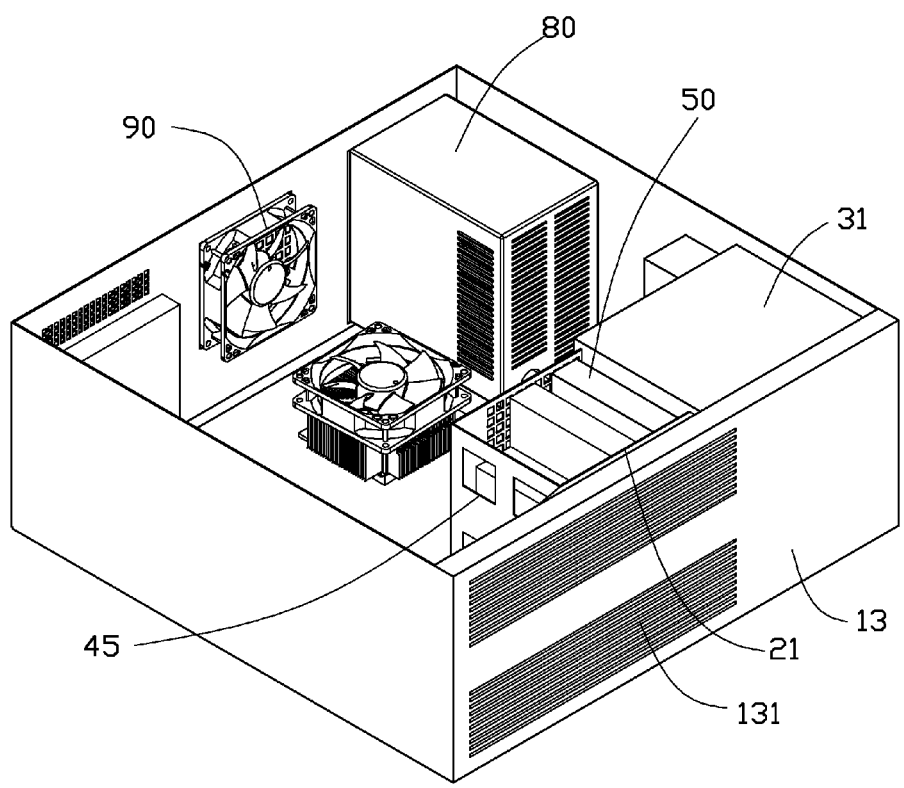
FIG. 4 is an assembled view of FIG. 2.

Referring to FIGS. 3-4, in assembly, the airflow guiding duct 20 is received in the gap 70 between the first mounting plate 41 and the front plate 13. Each of the two first guiding plates 21 is substantially perpendicular to the first mounting plate 41 and the front plate 13, and the right-angled edge 213 abuts the retaining wall 31. The two first guiding plates 21 are aligned with the top and bottom edges of the first mounting plate 41. Because the distance between the first edge 210 and the second edge 212 is substantially equal to that between the first mounting plate 41 and the front plate 13, each of the two first guiding plates 21 can be tightly sandwiched between the first mounting plate and the front plate 13, for covering the gap 70. The length of the first edge 210 is substantially equal to that of the first mounting plate 41. The first edge 210 can be adhered to the first mounting plate 41. The second guiding plate 23 can abut a connecting portion connected to the first mounting plate 41 and the third mounting plate 45, and the second guiding plate 23 is located between the bracket 40 and the first plate 17, for covering the gap 70. The retaining wall 31 and the airflow guiding duct 20 cooperatively define a path (not shown) communicating with the plurality of air intakes 131 and the plurality of first through holes 411. For the air flowing into the computer case 10 can be fully flown into the bracket 40 via the plurality of first through holes 411.

In use, air flows into the computer case 10 via the plurality of air intakes 131, with the airflow guiding duct 20, air flows into the bracket 40 by the plurality of first through holes 411, and out of the bracket 40 via the plurality of second through holes 431 and the plurality of third through holes 451. Then, air flows through the fan 90 and the power supply fan, and out of the computer case 10 via the plurality of air outlets 151. Therefore, the heat generated from the plurality of first heat generating components 50 can be removed It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer system, comprising:
   a computer case comprising a front plate and a first side plate substantially perpendicular to the front plate; the front plate defining a plurality of air intakes;
   a receiving tray comprising a retaining wall substantially perpendicular to the front plate;
   a bracket comprising a first mounting plate, second mounting plate opposite to the first mounting plate, and a third mounting plate substantially parallel to the first side plate; the first mounting plate abutting the retaining wall and substantially parallel to the front plate; a plurality of first through holes defined in the first mounting plate, and a plurality of second through holes defined in the second mounting plate; and
   an airflow guiding duct comprising two first guiding plates and a second guiding plate; the two first guiding plates substantially parallel to each other, and each first guiding plate abutting the retaining wall and comprising a slanted edge connected to the second guiding plate;
   wherein each first guiding plate is connected to the front plate and the first mounting plate, a first edge of the second guiding plate is aligned with a connecting edge connected to the first mounting plate and the third mounting plate, and a second opposite edge of the second guiding plate is aligned with a connecting edge connected to the front plate and the first side plate; the plurality of air intakes, the airflow guiding duct, the plurality of first through holes, and the plurality of second through holes together define a path for air flowing through.

2. The computer system of claim 1, wherein each first guiding plate comprises a first edge and a second opposite edge substantially parallel to the first edge, a length of the second opposite edge is greater than a length of the first edge, the slanted edge is connected to the first edge and the second opposite edge, and a distance between the first edge and the second opposite edge is substantially equal to a distance between the first mounting plate and the front plate.

3. The computer system of claim 2, wherein the length of the first edge is substantially equal to a length of the first mounting plate.

4. The computer system of claim 2, wherein the length of the second opposite edge is substantially equal to a distance between the retaining wall and the first side plate.

5. The computer system of claim 2, wherein the airflow guiding duct further comprises a right-angled edge connected to the first edge and the second opposite edge, and the right-angled edge abuts the retaining wall.

6. The computer system of claim 1, wherein the retaining wall, the first mounting plate, the second mounting plate and the third mounting plate cooperatively define a receiving space configured to receive a heat generating component.

7. The computer system of claim 6, wherein the heat generating component is a hard disk drive.

8. The computer system of claim 1, wherein the computer case further comprises a second side plate substantially parallel to the first side plate, and the retaining wall is away and substantially parallel to the second side plate.

9. The computer system of claim 1, wherein the first guiding plate is a right-angled trapezoid.

10. A computer system, comprising:
    a computer case comprising a front plate and a first side plate substantially perpendicular to the front plate; the front plate defining a plurality of air intakes;
    a receiving tray comprising a retaining wall substantially perpendicular to the front plate;
    a bracket comprising a first mounting plate, a second mounting plate opposite to the first mounting plate, and a third mounting plate substantially parallel to the first side plate; a gap defined between the first mounting plate and the front plate; a plurality of first through holes defined in the first mounting plate, and a plurality of second through holes defined in the second mounting plate; and
    an airflow guiding duct comprising two first guiding plates and a second guiding plate; the two first guiding plates substantially parallel to each other;
    wherein each first guiding plate is connected to the front plate and the first mounting plate, a first edge of the second guiding plate is aligned with a connecting edge connected to the first mounting plate and the third mounting plate, and a second opposite edge of the second guiding plate is aligned with a connecting edge connected to the front plate and the first side plate; so that the first guiding plate and the second guiding plate together cover the gap; and the plurality of air intakes, the airflow guiding duct, the plurality of first through holes, and the plurality of second through holes together define a path for air flowing through.

11. The computer system of claim 10, wherein each first guiding plate abuts the retaining wall and comprises a slanted edge, and the slanted edge connected to the second guiding plate.

12. The computer system of claim 11, wherein each first guiding plate comprises a first edge and a second opposite edge substantially parallel to the first edge, a length of the second opposite edge is greater than a length of the first edge, the slanted edge is connected to the first edge and the second opposite edge, and a distance between the first edge and the second opposite edge is substantially equal to a distance between the first mounting plate and the front plate.

13. The computer system of claim 12, wherein the length of the first edge is substantially equal to a length of the first mounting plate.

14. The computer system of claim 12, wherein the length of the second opposite edge is substantially equal to a distance between the retaining wall and the first side plate.

15. The computer system of claim 12, wherein the airflow guiding duct further comprises a right-angled edge connected to the first edge and the second opposite edge, and the right-angled edge abuts the retaining wall.

16. The computer system of claim 10, wherein the retaining wall, the first mounting plate, the second mounting plate, and the third mounting plate cooperatively define a receiving space configured to receive a heat generating component.

17. The computer system of claim 10, wherein the computer case further comprises a second side plate substantially parallel to the first side plate, and the retaining wall is away and substantially parallel to the second side plate.

18. The computer system of claim 10, wherein the first guiding plate is a right-angled trapezoid.

\* \* \* \* \*